(12) United States Patent
    Yun

(10) Patent No.: US 10,044,937 B2
(45) Date of Patent: Aug. 7, 2018

(54) ELECTRONIC DEVICE AND IMAGE STABILIZATION METHOD THEREOF

(71) Applicant: Samsung Electronics Co., Ltd., Gyeonngi-do (KR)

(72) Inventor: Jae Mu Yun, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/341,420

(22) Filed: Nov. 2, 2016

(65) Prior Publication Data
    US 2017/0126978 A1    May 4, 2017

(30) Foreign Application Priority Data
    Nov. 2, 2015 (KR) ................ 10-2015-0153039

(51) Int. Cl.
    *H04N 5/228*    (2006.01)
    *H04N 5/232*    (2006.01)
    *H04N 5/225*    (2006.01)

(52) U.S. Cl.
    CPC ....... *H04N 5/23287* (2013.01); *H04N 5/2254* (2013.01); *H04N 5/2258* (2013.01); *H04N 5/23254* (2013.01); *H04N 5/23258* (2013.01); *H04N 5/23293* (2013.01)

(58) Field of Classification Search
    CPC ............ H04N 5/23287; H04N 5/2254; H04N 5/23254; H04N 5/2258; H04N 5/23258; H04N 5/23293

USPC ............................. 348/208.99, 208.1–208.16
    See application file for complete search history.

(56) References Cited

U.S. PATENT DOCUMENTS

| 6,408,135 B1 | 6/2002 | Imada |
| 9,258,487 B2 | 2/2016 | Lee et al. |
| 2014/0168383 A1* | 6/2014 | Murakami ............... G02B 7/36 348/47 |
| 2014/0320678 A1 | 10/2014 | Lee et al. |
| 2016/0150157 A1 | 5/2016 | Lee et al. |
| 2016/0360111 A1* | 12/2016 | Thivent ............. H04N 5/23287 |

FOREIGN PATENT DOCUMENTS

| KR | 1020130059811 | 6/2013 |
| KR | 1020140104065 | 8/2014 |

* cited by examiner

*Primary Examiner* — Yogesh Aggarwal
(74) *Attorney, Agent, or Firm* — The Farrell Law Firm, P.C.

(57) ABSTRACT

An electronic device is provided. The electronic device includes a first camera module including a first lens and a first image sensor configured to photograph an image through the first lens, a processor configured to determine a motion of a pixel included in the image photographed by the first image sensor, and a second camera module including a second lens, a gyro sensor configured to detect a motion of the electronic device, and an image stabilization module configured to calculate a correction value using motion information of the electronic device and motion information of the pixel and to perform image stabilization based on the correction value.

12 Claims, 9 Drawing Sheets

ELECTRONIC DEVICE AND IMAGE STABILIZATION METHOD THEREOF

PRIORITY

This application claims priority under 35 U.S.C. § 119(a) to Korean Patent Application Serial No. 10-2015-0153039, which was filed in the Korean Intellectual Property Office on Nov. 2, 2015, the entire disclosure of which is incorporated herein by reference.

BACKGROUND

1. Field of the Disclosure

The present disclosure relates generally to an image stabilization method of an electronic device including a camera function, and more particularly, to an image stabilization method that is configured to minimize an error of a gyro sensor included in the electronic device, thereby improving overall quality of an image captured using the electronic device.

2. Description of the Related Art

With the development of electronic technologies, various types of electronic devices are being developed, such as a smartphone, a tablet PC, or the like.

Sometimes when a user photographs an image using the electronic device, the image may be blurred by movement of the electronic device, e.g., a shake of a hand holding the electronic device. To prevent such an occurrence, stabilization methods for use with an electronic device have been developed.

For example, an image stabilization function which is applied to the electronic device can correct an image by detecting a motion of the electronic device using a gyro sensor, and moving a lens of the electronic device in a direction opposite to that of the motion of the electronic device.

However, an accuracy of a gyro sensor may be reduced because a drift error can sometimes occur during the correction process. In addition, since an exposure time increases in the case where the electronic device photographs an image at a slow shutter speed, the image can also be excessively blurred.

SUMMARY

Aspects of the present disclosure have been made to address at least the above-mentioned problems and/or disadvantages and to provide at least the advantages described below. Accordingly, an aspect of the present disclosure is to provide an electronic device capable of minimizing an error of a gyro sensor and improving an image stabilization function, through various embodiments of the present invention and an image stabilization method of the electronic device.

In accordance with an aspect of the present disclosure, there is provided an electronic device. The electronic device includes a first camera module including a first lens and a first image sensor configured to photograph an image through the first lens, a processor configured to determine a motion of a pixel included in the image photographed by the first image sensor, and a second camera module including a second lens, a gyro sensor configured to detect a motion of the electronic device, and an image stabilization module configured to calculate a correction value using motion information of the electronic device and motion information of the pixel and to perform image stabilization based on the correction value.

In accordance with an aspect of the present disclosure, there is provided an image stabilization method. The image stabilization method includes detecting a motion of the electronic device using a gyro sensor, photographing an image through a lens of the electronic device, determining a motion of a pixel included in the image, calculating a correction value using motion information of the electronic device and motion information of the pixel, and performing image stabilization based on the correction value.

In accordance with another aspect of the present disclosure, there is provided a non-transitory computer-readable recording medium having recorded thereon a program for performing a method that includes detecting a motion of the electronic device using a gyro sensor, photographing an image through a lens of the electronic device, determining a motion of a pixel included in the image, calculating a correction value using motion information of the electronic device and motion information of the pixel, and performing image stabilization based on the correction value.

BRIEF DESCRIPTION OF THE DRAWINGS

The above and other aspects, features, and advantages of certain embodiments of the present disclosure will be more apparent from the following detailed description taken in conjunction with the accompanying drawings, in which.

Throughout the drawings, it should be noted that like reference numbers are used to depict the same or similar elements, features, and structures.

DETAILED DESCRIPTION

Figure 1:
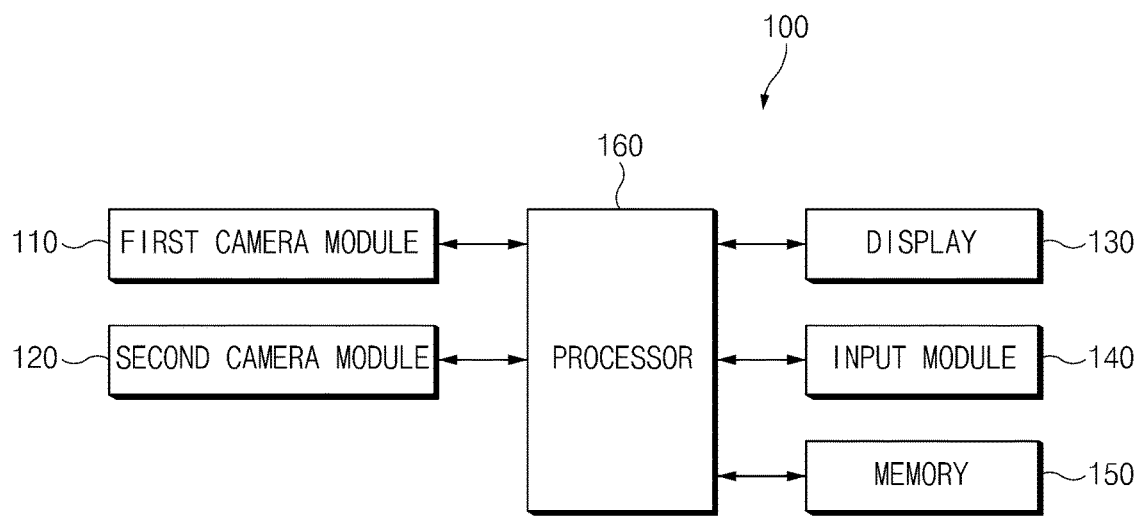
FIG. 1 is a block diagram illustrating a configuration of an electronic device, according to an embodiment of the present disclosure.

Embodiments of the present disclosure will be described herein below with reference to the accompanying drawings. However, the embodiments of the present disclosure are not limited to the specific embodiments and should be construed as including all modifications, changes, equivalent devices and methods, and/or alternative embodiments of the present disclosure.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may modify various elements regardless of an order and/or importance of the corresponding elements, and do not limit the corresponding elements. These terms may be used for the purpose of distinguishing one element from another element. For example, a first user device and a second user device may indicate different user devices regardless of the order or importance. For example, a first element may be referred to as a second element without departing from the scope the present invention, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a CPU or an application processor) capable of performing a corresponding operation by executing one or more software programs stored in a memory device.

The term "module" as used herein may be defined as, for example, a unit including one of hardware, software, and firmware or two or more combinations thereof. The term "module" may be interchangeably used with, for example, the terms "unit", "logic", "logical block", "component", or "circuit", and the like. The "module" may be a minimum unit of an integrated component or a part thereof. The "module" may be a minimum unit performing one or more functions or a part thereof. The "module" may be mechanically or electronically implemented. For example, the "module" may include at least one of an application-specific integrated circuit (ASIC) chip, field-programmable gate arrays (FPGAs), or a programmable-logic device, which is well known or will be developed in the future, for performing certain operations.

The terms used in describing the various embodiments of the present disclosure are for the purpose of describing particular embodiments and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the present disclosure.

Electronic devices according to the embodiments of the present disclosure may include at least one of, for example, smart phones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to an embodiment of the present disclosure, the wearable devices may include at least one of accessory-type wearable devices (e.g., watches, rings, bracelets, anklets, necklaces, glasses, contact lenses, or head-mounted-devices (HMDs)), fabric or clothing integral wearable devices (e.g., electronic clothes), body-mounted wearable devices (e.g., skin pads or tattoos), or implantable wearable devices (e.g., implantable circuits).

Hereinafter, the electronic devices according to various embodiments of the present disclosure will be described with reference to the accompanying drawings. The term "user" as used herein may refer to a person who uses an electronic device or may refer to a device (e.g., an artificial intelligence electronic device) which uses an electronic device.

FIG. 1 is a block diagram illustrating a configuration of an electronic device, according to an embodiment of the present disclosure.

Referring to FIG. 1, an electronic device 100 includes a first camera module 110, a second camera module 120, a display 130, an input module 140, a memory 150, and a processor 160. The electronic device 100 may perform image stabilization by using motion information of an image (or a pixel included in an image) generated through an image sensor in addition to motion information of an electronic device obtained by a gyro sensor. The electronic device 100 may be embodiment in a smartphone, a digital camera, or the like and can include a photographing function.

The first camera module 110 or the second camera module 120 may photograph an image (e.g., a picture or a video) that appears through a lens of the electronic device 100. The first camera module 110 or the second camera module 120 may photograph an image at different time points or at the same time. To prevent a shake of an image caused by a user (e.g., a shake or movement of a hand of a user), the first camera module 110 or the second camera module 120 may perform image stabilization upon photographing of an image.

The display 130 may display an image, which is photographed by the first camera module 110 or the second camera module 120, or an image stored in the memory 150.

The input module 140 may receive a user input for photographing or storing an image and/or for determining whether an image stabilization function is used.

The input module 140 may include a touch sensor panel, which senses a touch manipulation of a user, or a pen sensor panel (e.g., a digitizer) that senses the pen manipulation of a user. The input module 140 may include a motion recognition sensor, which recognizes the motion of a user, or a voice recognition sensor that recognizes the voice of a user. The input module 140 may include various kinds of input buttons such as a push button, a jog button, and the like.

The display 130 and the input module 140, for example, may be implemented with a touch screen that is capable of displaying and sensing a touch manipulation at the same time. With respect to the touch screen, an input panel may be disposed on the display panel.

The memory 150 may store an image photographed by the first camera module 110 or the second camera module 120. For example, the memory 150 may store an image such as a picture, a video, or the like.

The processor 160 may control the overall operations of the electronic device 100. The processor 160 may make it possible to perform image stabilization by controlling the first camera module 110, the second camera module 120, the display 130, the input module 140, and the memory 150.

The processor 160 may store an image, which is received from the first camera module 110 or the second camera module 120, in the memory 150. The processor 160 may determine a motion of a pixel included in an image by analyzing the image received from the first camera module 110 or the second camera module 120, and the processor 160 may send the motion information of a pixel to the first camera module 110 or the second camera module 120.

Figure 2:
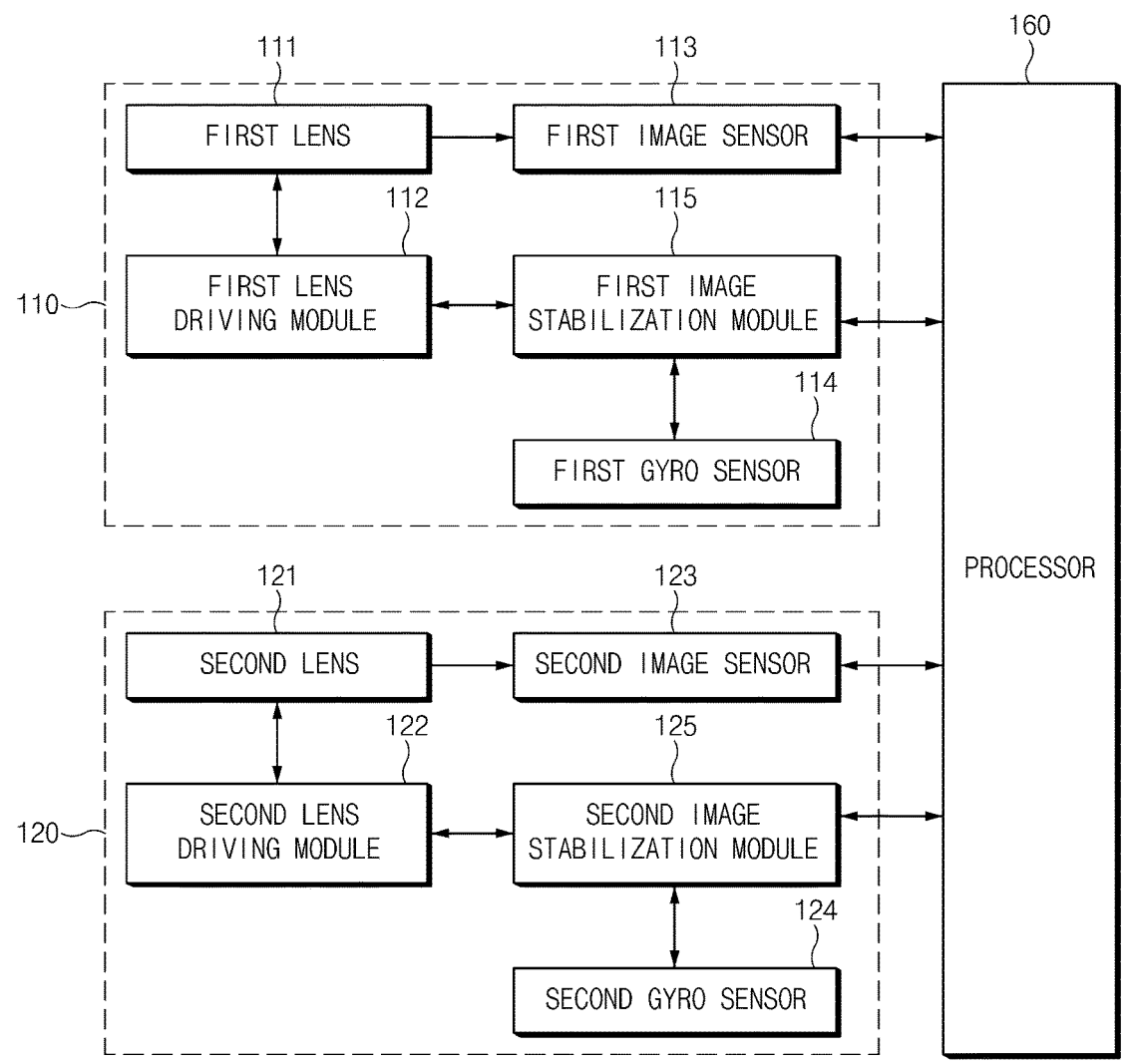
FIG. 2 is a diagram illustrating a configuration of a camera module, according to an embodiment of the present disclosure.

FIG. 2 is a diagram illustrating a configuration of a camera module, according to an embodiment of the present disclosure.

Referring to FIG. 2, the first camera module 110 includes a first lens 111, a first lens driving module 112, a first image sensor 113, a first gyro sensor 114, and a first image stabilization module 115.

The first lens 111 may receive light that is reflected from a subject placed in field of view. The first lens 111 may be arranged such that the first lens 111 faces a specified direction (e.g., the front or rear direction of the electronic device 100). The first lens 111 may include an aperture that adjusts the amount of light thus input.

The first lens driving module 112 may drive the first lens 111, and the first lens driving module 112 may control the motion of the first lens 111 by adjusting the position (or a direction) of the first lens 111.

The first image sensor 113 may convert light, which is input through the first lens 111, into an electric signal. For example, the first image sensor 113 may generate an image by using subject information included in the light received through the first lens 111. The first image sensor 113 may generate an image for image stabilization at a specific period (e.g., 1/60 seconds). The first image sensor 113 may send the generated image to the processor 160.

The first gyro sensor 114 may detect the motion of the electronic device 100 (or the first camera module 110 and the first gyro sensor 114 may output an angular velocity corresponding to the motion of the electronic device 100. The first gyro sensor 114 may be a dual-axis gyro sensor. For example, the first gyro sensor 114 may output the angular velocity of each of a yaw axis and a pitch axis with respect to a direction that the first lens 111 faces, by detecting the motion of the electronic device 100.

To prevent the shake of an image due to a movement of a user (e.g., shake of a hand of the user), the first image stabilization module 115 may perform image stabilization of the first camera module 110 upon photographing an image. The first image stabilization module 115 may calculate a correction value by using the motion of the electronic device 100, which is received from the first gyro sensor 114, and the motion of a pixel that is received from the processor 160. The first image stabilization module 115 may perform image stabilization by using the calculated correction value. For example, the first image stabilization module 115 may control the first lens driving module 112 such that the position of the first lens 111 is changed according to the correction value.

Referring to FIG. 2, the second camera module 120 includes a second lens 121, a second lens driving module 122, a second image sensor 123, a second gyro sensor 124, and a second image stabilization module 125.

The second lens 121 may receive light that is reflected from a subject placed in field of view. The second lens 121 may be arranged such that the second lens 111 faces a specified direction (e.g., the front or rear direction of the electronic device 100). For example, the second lens 121 may be arranged such that the second lens 121 faces the same direction as the first lens 111. The second lens 121 may include an aperture that adjusts the amount of light thus input.

The second lens driving module 122 may drive the second lens 121, and the second lens driving module 122 may control the motion of the second lens 121 by adjusting the position (or a direction) of the second lens 121.

The second image sensor 123 may convert light, which is input through the second lens 121, into an electric signal. For example, the second image sensor 123 may generate an image by using subject information included in the light received through the second lens 121. The second image sensor 123 may generate an image for image stabilization at a specific period (e.g., 1/60 seconds). The second image sensor 123 may send the generated image to the processor 160.

The second gyro sensor 124 may detect the motion of the electronic device 100 (or the second camera module 120), and the second gyro sensor 124 may output an angular velocity corresponding to the motion of the electronic device 100. The second gyro sensor 124 may be a dual-axis gyro sensor. For example, the second gyro sensor 124 may output the angular velocity of each of a yaw axis and a pitch axis with respect to a direction that the second lens 121 faces, by detecting the motion of the electronic device 100.

To prevent the shake of an image due to the movement of a user, the second image stabilization module 125 may perform image stabilization of the second camera module 120 upon photographing an image. The second image stabilization module 125 may calculate a correction value by using the motion of the electronic device 100, which is received from the second gyro sensor 124, and the motion of a pixel that is received from the processor 160. The second image stabilization module 125 may perform image stabilization by using the calculated correction value. For example, the second image stabilization module 125 may control the second lens driving module 122 such that the position of the second lens 121 is changed according to the correction value.

One or more elements included in the first camera module 110 and the second camera module 120 may be omitted. For example, in the case where the electronic device 100 is configured to perform image stabilization on only the first camera module 110, at least a part of the second lens driving module 122, the second gyro sensor 124, and the second image stabilization module 125 of elements included in the second camera module 120 illustrated in FIG. 2 may be omitted.

Figure 3B:
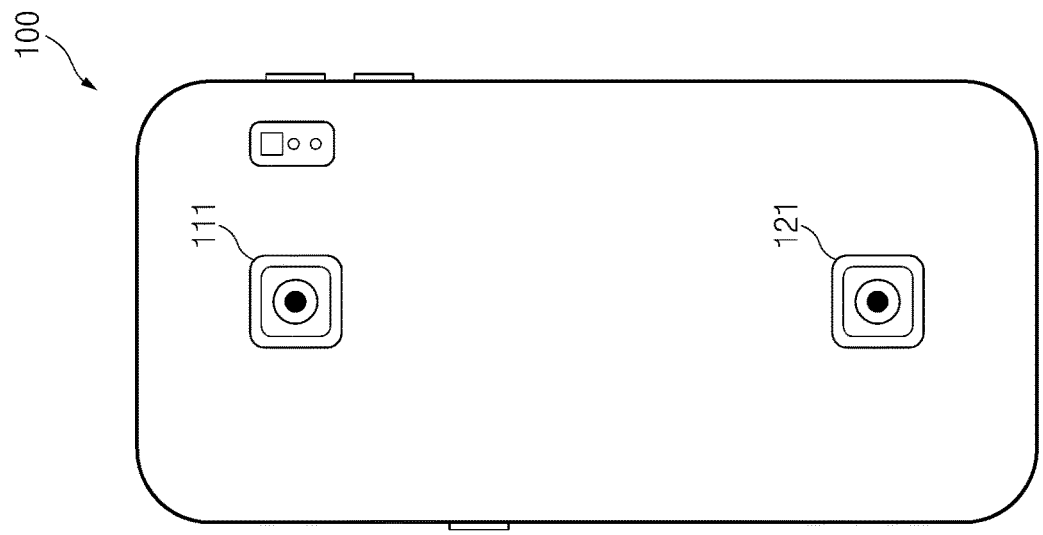
FIGS. 3A and 3B are screenshots illustrating a position of a lens, according to an embodiment of the present disclosure.
Figure 3A:
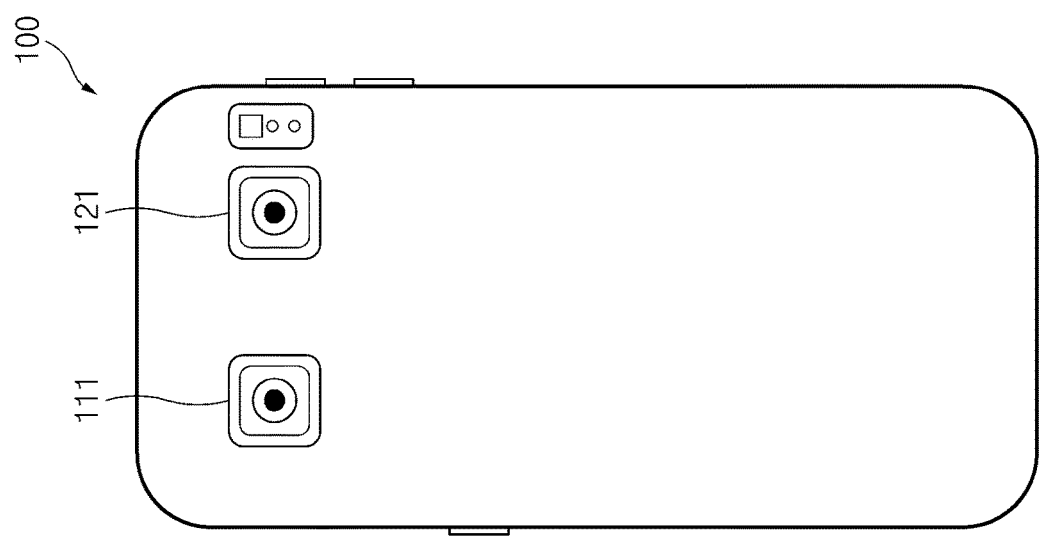

FIGS. 3A and 3B are screen shots illustrating a position of a lens, according to an embodiment of the present disclosure.

As noted above with respect to FIG. 2, the electronic device 100 may include a plurality of lenses (e.g., the first lens 111 and the second lens 121). In the case where the electronic device 100 is implemented in a smartphone, FIGS. 3A and 3B illustrate positions of a plurality of lenses 111 and 121.

Referring to FIG. 3A, the electronic device 100 may include the first lens 111 that faces a rear direction of the electronic device 100. The second lens 121 may face the same direction as the first lens 111 and may be arranged crosswise in parallel with the first lens 111.

Referring to FIG. 3B, the electronic device 100 may include the first lens 111 that faces a rear direction of the electronic device 100. The second lens 121 may face the same direction as the first lens 111 and may be arranged lengthwise in parallel with the first lens 111.

Figure 4:
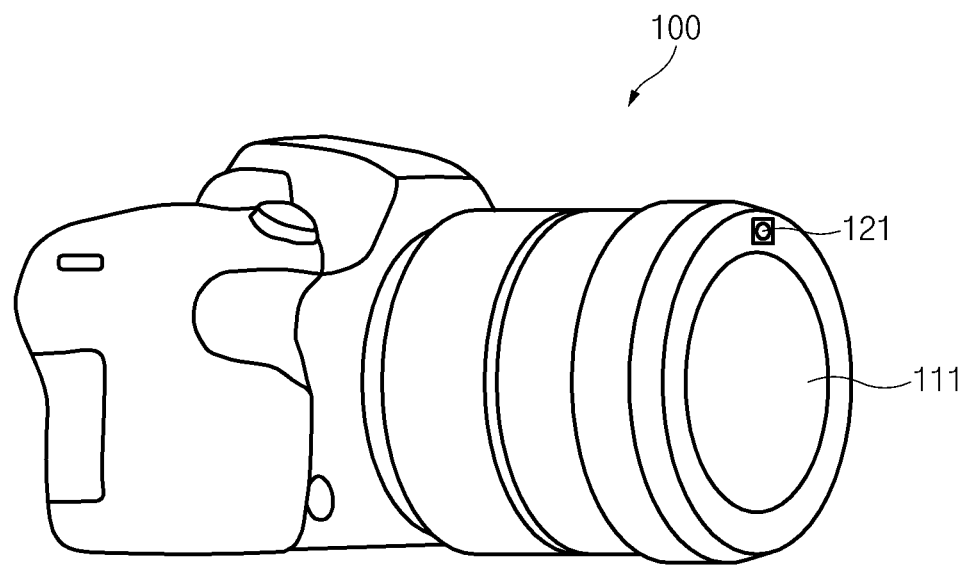
FIG. 4 is a perspective view of camera including a plurality of lenses, according to an embodiment of the present disclosure.

FIG. 4 is a perspective view of camera including a plurality of lenses, according to an embodiment of the present disclosure.

Referring to FIG. 4, the electronic device 100 may include the first lens 111 that faces a front direction of the electronic device 100. The second lens 121 may be placed in a vicinity of the first lens 111 facing in the same direction as the first lens 111. The first lens 111 may be a main lens of the electronic device 100, and the second lens 121 may be a sub-lens of the electronic device 100. For example, the second lens 121 may be a lens for photographing an image used for the image stabilization of the first camera module 110. The camera module 120 including the second lens 121 may include only the second lens 121 and the second image sensor 123 except, for example, the second lens driving module 122, the second image stabilization module 124, and the second gyro sensor 125.

Hereinafter, an image stabilization process performed at the electronic device 100 will be described in detail. The image stabilization may be applied to both the first camera module 110 and the second camera module 120. However, for convenience of description, the case where the image stabilization is performed at the second camera module 120 will only be described.

The second gyro sensor 124 may send motion information of the electronic device 100 to the second image stabilization module 125. For example, the second gyro sensor 124 may send the angular velocity of each of a yaw axis and a pitch axis with respect to a direction that the second lens 121 faces; the same or similar operations may be performed by the first camera module 110.

Figure 5A:
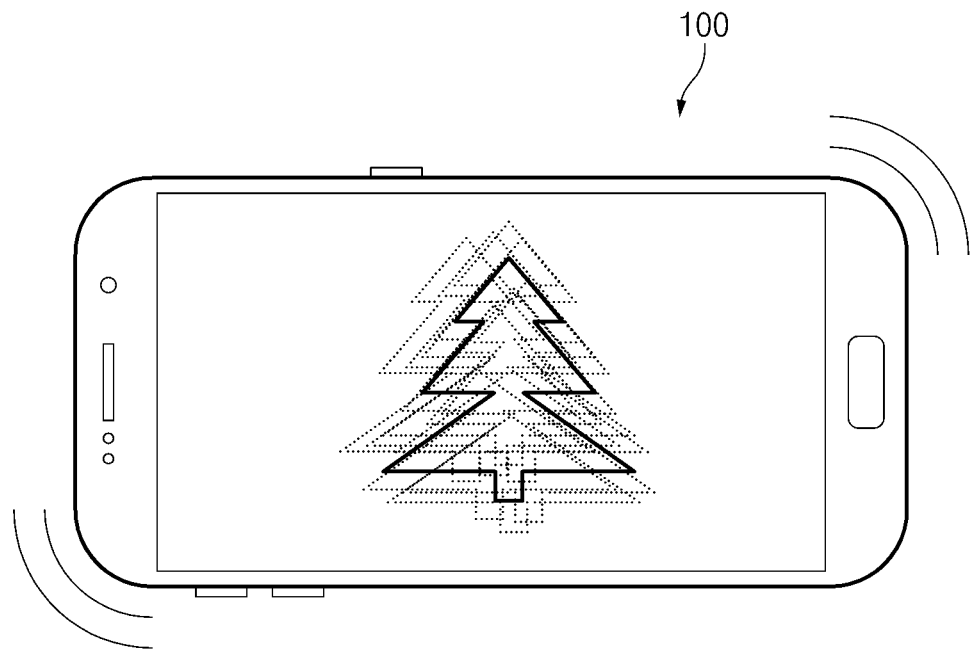
FIGS. 5A and 5B are screenshots illustrating a calculated motion vector, according to an embodiment of the present disclosure.
Figure 5B:
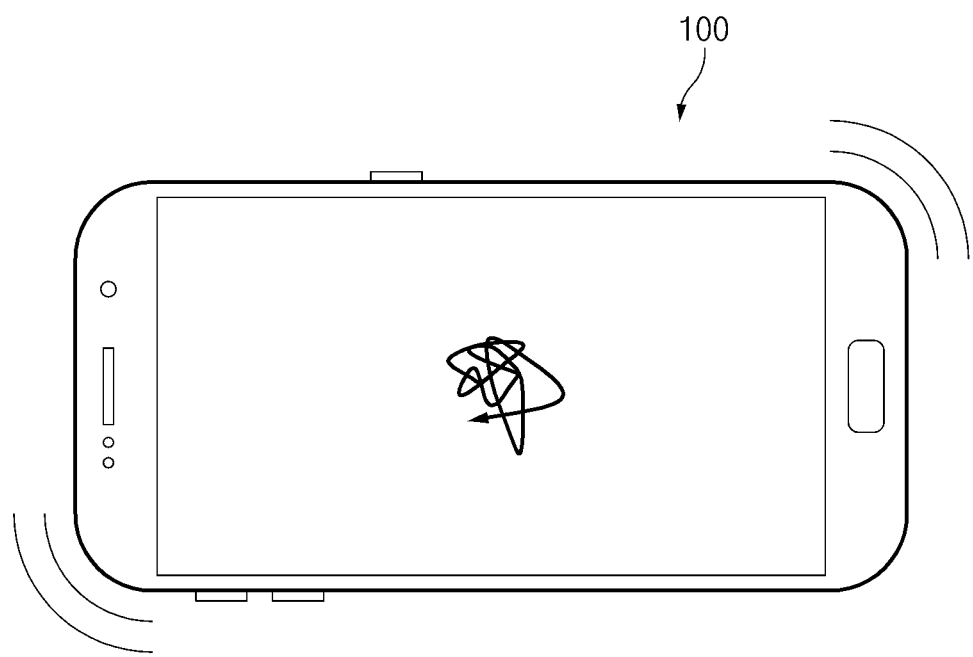

FIGS. 5A and 5B are screen shots illustrating a calculated motion vector, according to an embodiment of the present disclosure.

The processor 160 may determine a motion of a pixel included in an image by analyzing the image received from the first image sensor 113. The processor 160 may receive an image from the first image sensor 113 at a specific period (e.g., 1/60 seconds). Referring to FIG. 5A, a subject (or a pixel) included in an image (e.g., an evergreen tree) generated by the first image sensor 113 may be moved by a movement of a user. The processor 160 may determine the motion of a pixel included in the image by comparing images, which are successively received from the first image sensor 113, with each other. For example, the processor 160 may calculate the motion vector (e.g., a two-dimensional vector) of a pixel included in the image received from the first image sensor 113. Referring to FIG. 5B, the processor 160 may calculate a motion vector such that a motion vector corresponds to the movement of a subject (or a pixel) included in an image (e.g., a squiggly line).

The processor 160 may send the motion information of a pixel (e.g., the motion vector of a pixel), which is included in the image, to the second image stabilization module 125. The processor 160 may determine the motion of a pixel by using the image photographed by the first camera module 110, which is different from the second camera module 120, which performs image stabilization. For example, an image generated by the first image sensor 113 may be used in the case where the image stabilization is performed at the second camera module 120. As another example, an image generated by the second image sensor 123 may be used in the case where the image stabilization is performed at the first camera module 110.

The second image stabilization module 125 may calculate a correction value by using the motion information of the electronic device 100, which is received from the second gyro sensor 124, and the motion information of a pixel that is received from the processor 160. The second image stabilization module 125 may calculate a measurement error of the second gyro sensor 124 based on the motion information of the electronic device 100 and the motion information of a pixel. The measurement error may correspond to, for example, a drift error of the second gyro sensor 124. The second image stabilization module 125 may remove the measurement error from the motion information of an electronic device. The second image stabilization module 125 may calculate a correction value based on the motion information of an electronic device from which the measurement error is removed.

Figure 6:
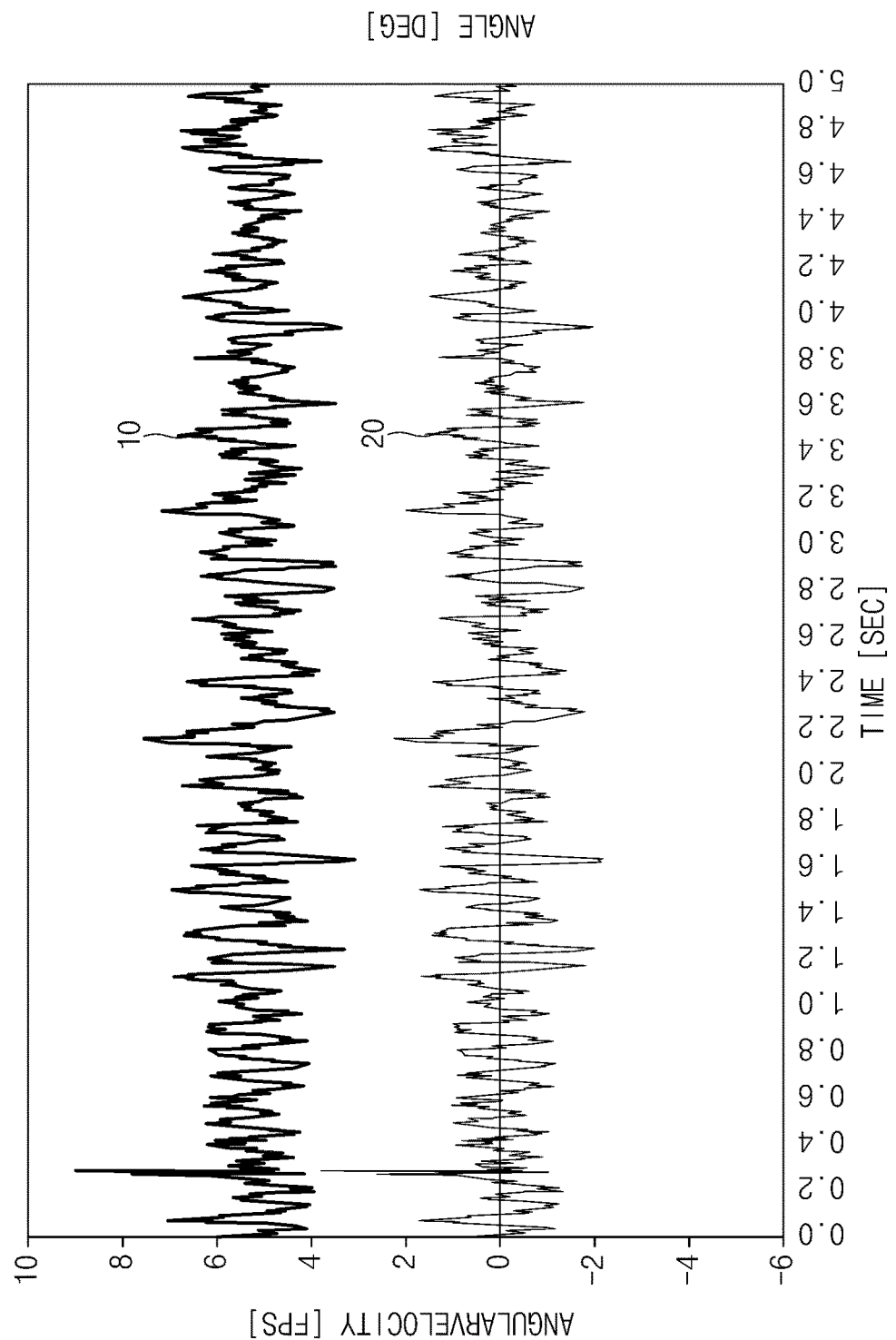
FIG. 6 is a graph of angular velocity vs. time, according to an embodiment of the present disclosure.

FIG. 6 is a graph of angular velocity vs. time, according to an embodiment of the present disclosure.

Referring to FIG. 6, an angular velocity value 10 that is output from the second gyro sensor 124 for one second is illustrated (top portion of graph). The second image stabilization module 125 may remove a direct current (DC) offset from an angular velocity value received from the second gyro sensor 124. For example, the second image stabilization module 125 may subtract the DC offset from the angular velocity value received from the second gyro sensor 124. The DC offset that is set in the second gyro sensor 124 may be stored in, for example, a memory (e.g., a flash memory) included in the second image stabilization module 125. The DC offset may be differently set on, for example, each angular velocity output from a gyro sensor. The second image stabilization module 125 may obtain an angular velocity value 20 (bottom portion of graph) from which the DC offset is removed, by subtracting the DC offset from the angular velocity value 10 output from the second gyro sensor 124.

Figure 7:
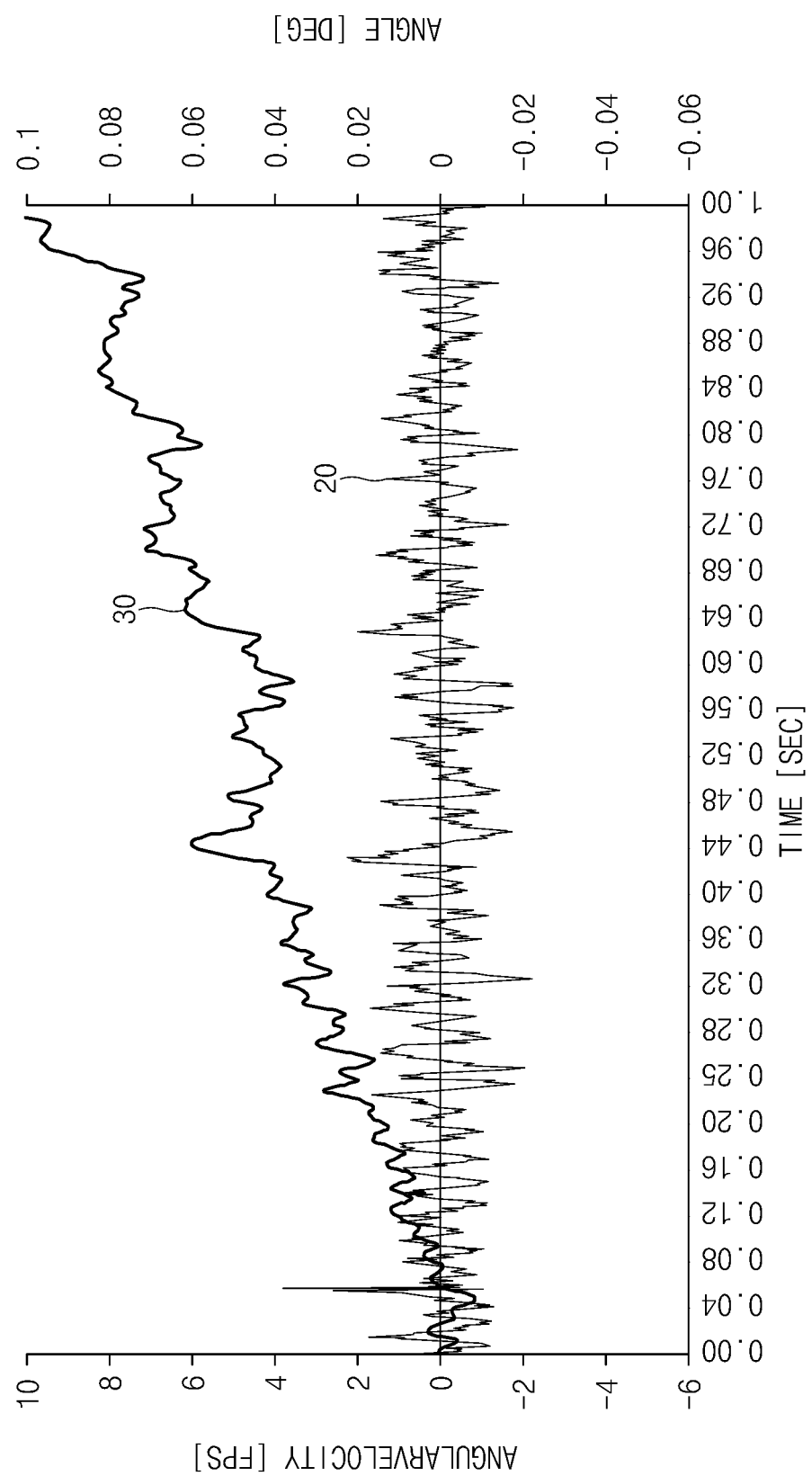
FIG. 7 is a graph of angular velocity vs. time, according to an embodiment of the present disclosure.

FIG. 7 is a graph of angular velocity vs. time, according to an embodiment of the present disclosure.

Referring to FIG. 7, the angular velocity value 20 from which a DC offset is removed is illustrated. The second image stabilization module 125 may calculate a first angle value 30 (top portion of graph by integrating an angular velocity value from which the DC offset is removed. For example, the second image stabilization module 115 may calculate the first angle value 30 on each of a yaw axis and a pitch axis. The first angle value 30 may correspond to, for example, the rotation angle of the electronic device 100. The first angle value 30 may include, for example, the drift error of a gyro sensor. Referring to the first angle value 30, it is understood that an error of about 0.1° (degrees) for one second occurs because the error included in an angular velocity value is accumulated.

Figure 8:
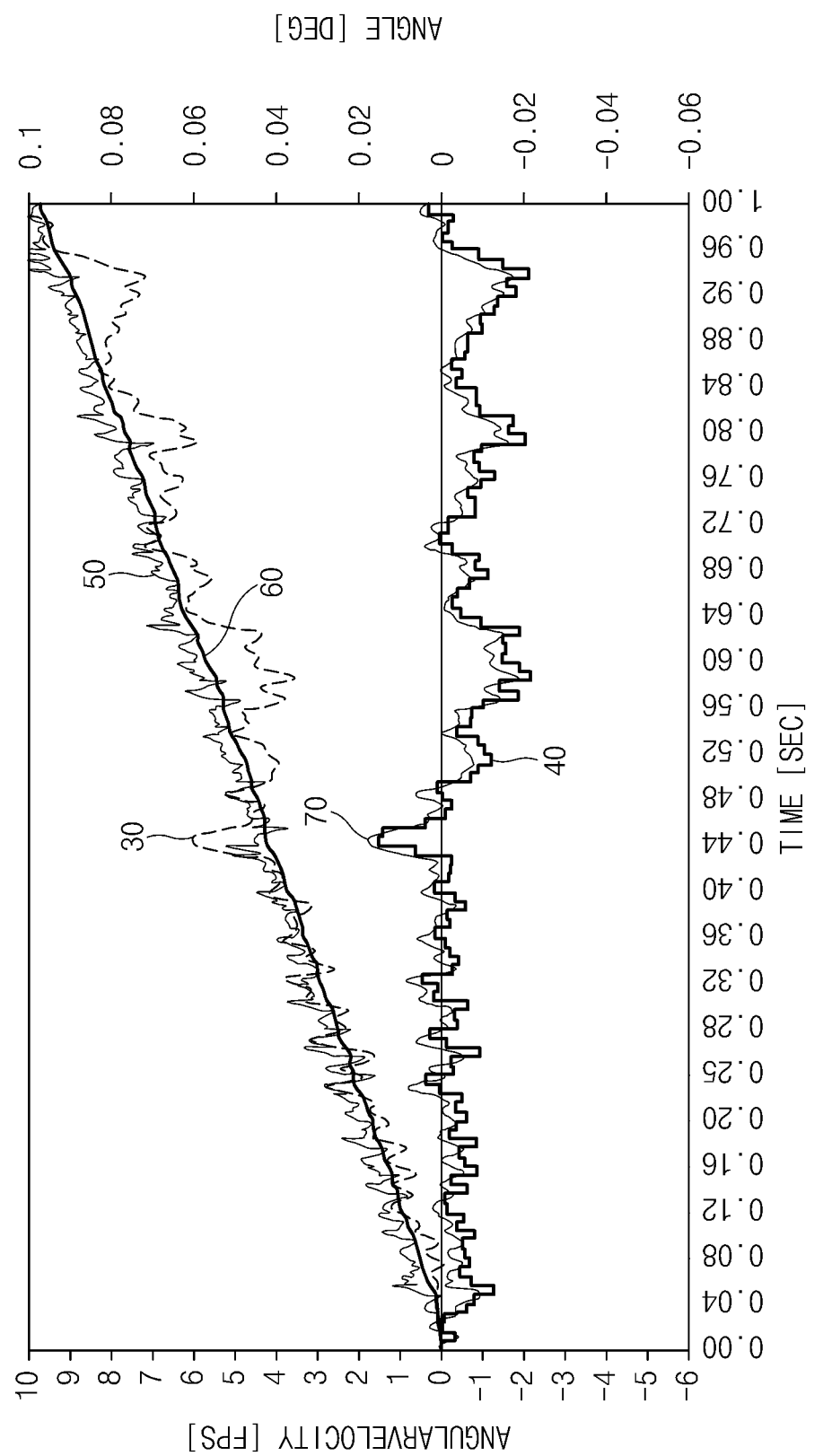
FIG. 8 is a graph of angular velocity vs. time which is used in describing a generation process, according to an embodiment of the present disclosure, according to various embodiments of the present invention.

FIG. 8 is a graph of angular velocity vs. time which is used in describing a generation process, according to an embodiment of the present disclosure.

Referring to FIG. 8, the first angle value 30 calculated by the second image stabilization module 125 is illustrated. The second image stabilization module 125 may calculate a second angle value 40 (bottom portion of graph) corresponding to the motion information of a pixel received from the processor 160. For example, the second image stabilization module 125 may calculate the second angle value 40 on each of a yaw axis and a pitch axis by using a motion vector received from the processor 160. The first image sensor 113 may generate an image at a period (e.g., 1/60 seconds) longer than that of the second gyro sensor 124. Since the number of samples of the second angle value 40 is smaller than that of the first angle value 30, a graph illustrates in the form of a coarse curve.

The second image stabilization module 125 may calculate a measurement error 50 (top portion of graph) of the second gyro sensor 124 by subtracting the second angle value 40 from the first angle value 30. The second image stabilization module 125 may filter the measurement error 50 by using a low pass filter. Since a noise is removed, for example, a filtered measurement error 60 (top portion of graph) may be more linear than the existing measurement error 50. The second image stabilization module 125 may remove the filtered measurement error 60 from the first angle value 30. For example, the second image stabilization module 125 may obtain an angle value 70 (bottom portion of graph), from which a measurement error is removed, by subtracting the filtered measurement error 60 from the first angle value 30.

The second image stabilization module 125 may calculate a correction value based on the angle value 70 from which the measurement error is removed. For example, the second image stabilization module 125 may calculate an angle value, of which the magnitude is the same as the angle value 70 and of which the direction is opposite to the angle value 70, as a correction value by multiplying the angle value 70, from which the measurement error is removed, by '−1'.

The second image stabilization module 125 may perform image stabilization by using the calculated correction value. For example, the second image stabilization module 125 may control the second lens driving module 122 such that the position of the second lens 121 is changed according to the correction value.

Figure 9:
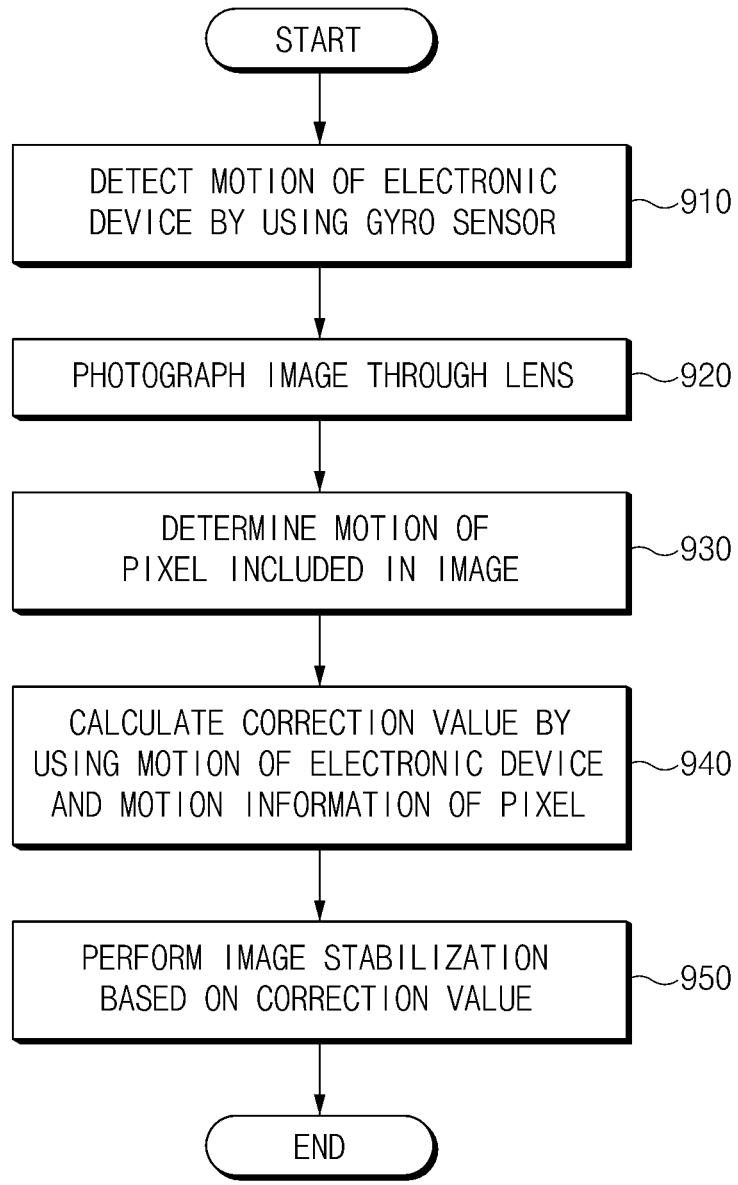
FIG. 9 is a flowchart of an image stabilization method of an electronic device, according to an embodiment of the present disclosure.

FIG. 9 is a flowchart of an image stabilization method of an electronic device, according to an embodiment of the present disclosure.

The method of FIG. 9 may include operations which the electronic device 100 of FIG. 1 processes. Even though omitted below, details about the electronic device 100 described with reference to FIGS. 1 to 8 may be applied to the method of FIG. 9.

Referring to FIG. 9, in step 910, the electronic device 100 may detect the motion of the electronic device 100 using the second gyro sensor 124. The electronic device 100 may also detect an angular velocity corresponding to the motion of the electronic device 100 using the gyro sensor. For example, the electronic device 100 may detect the angular velocity of each of a yaw axis and a pitch axis with respect to a direction, which the second lens 121 faces.

In step 920, the first image sensor 113 may photograph an image through the first lens 111. For example, the electronic device 100 may generate the image by using subject information included in the light received through the first lens 111. The electronic device 100 may generate an image for image stabilization at a specific period (e.g., 1/60 seconds).

In step 930, the processor 160 may determine the motion of a pixel included in an image by comparing images, which are successively generated, with each other. For example, the electronic device 100 may calculate the motion vector (e.g., a two-dimensional vector) of a pixel included in the image. The electronic device 100 may determine the motion of a pixel by using the image photographed by the first camera module 110, which is different from the second camera module 120 that performs image stabilization.

In step 940, the second image stabilization module 125 may calculate a correction value by using motion information of the electronic device 100 and motion information of a pixel. More particularly, the electronic device 100 may calculate the measurement error of a gyro sensor based on the motion information of the electronic device 100 and the motion information of a pixel. The measurement error may correspond to, for example, the drift error of a gyro sensor. The electronic device 100 may remove the measurement error from the motion information of an electronic device. The electronic device 100 may calculate the correction value based on the motion information of an electronic device from which the measurement error is removed.

The electronic device 100 may remove a DC offset from an angular velocity value detected by a gyro sensor. For example, the electronic device 100 may substrate the DC offset from the angular velocity value. The electronic device 100 may calculate a first angle value by integrating the angular velocity value from which the DC offset is removed. For example, the electronic device 100 may calculate the first angle value on each of a yaw axis and a pitch axis. The electronic device 100 may calculate a second angle value corresponding to the motion information of a pixel (e.g., a motion vector). For example, the electronic device 100 may calculate the second angle value on each of a yaw axis and a pitch axis by using a motion vector. The electronic device 100 may calculate the measurement error of a gyro sensor by subtracting the second angle value from the first angle value.

The electronic device 100 may filter the measurement error by using a low pass filter. Since noise is removed, for example, a filtered measurement error may be more linear than the existing measurement error. The electronic device 100 may remove the filtered measurement error from the first angle value. For example, the electronic device 100 may obtain an angle value, from which the measurement error is removed, by subtracting the filtered measurement error from the first angle value.

The electronic device 100 may calculate the correction value based on the angle value from which the measurement error is removed. For example, the electronic device 100 may calculate an angle value, of which the magnitude is the same as the angle value and of which the direction is opposite to the angle value, as the correction value by multiplying the angle value, from which the measurement error is removed, by '4'.

In step 950, the second image stabilization module 125 may perform image stabilization based on the correction value. For example, the electronic device 100 may control the second lens driving module 122 such that the position of the second lens 121 is changed according to the correction value.

Each of the elements described herein may be configured with one or more components, and the names of the elements may be changed according to the type of an electronic device. An electronic device may include at least one of the elements described herein, and some elements may be omitted or other additional elements may be added. Furthermore, some of the elements of the electronic device may be combined with each other so as to form one entity, so that the functions of the elements may be performed in the same manner as before the combination.

At least a part of devices (e.g., modules or functions thereof) or methods (e.g., operations) of the present disclosure may be implemented as instructions stored in a non-transitory computer-readable storage medium in the form of a program module. In the case where the instructions are performed by a processor (e.g., the processor 120), the processor may perform functions corresponding to the instructions. The non-transitory computer-readable storage medium may be, for example, the memory 130.

A non-transitory computer-readable recording medium may include a hard disk, a floppy disk, a magnetic medium (e.g., a magnetic tape), an optical medium (e.g., compact disc-read only memory (CD-ROM), digital versatile disc (DVD)), a magneto-optical medium (e.g., a floptical disk), or a hardware device (e.g., a ROM, a random access memory (RAM), a flash memory, or the like). The program instructions may include machine language codes generated by compilers and high-level language codes that can be executed by computers using interpreters. The above-mentioned hardware device may be configured to be operated as one or more software modules for performing operations of various embodiments of the present disclosure and vice versa.

A module or a program module of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

In accordance with the present disclosure, image stabilization may be performed by using an image generated through an image sensor as well as an output value of a gyro sensor, thereby improving the performance of an image stabilization function associated with the electronic device 100.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. An electronic device comprising:
a first camera module including a first lens and a first image sensor configured to photograph an image through the first lens;
a processor configured to determine a motion of a pixel included in the image photographed by the first image sensor; and
a second camera module including a second lens, a gyro sensor configured to detect a motion including an angular velocity of the electronic device, and an optical image stabilization module configured to calculate a correction value using motion information of the electronic device and motion information of the pixel and to perform optical image stabilization based on the correction value, wherein the optical image stabilization module is further configured to:
remove a direct current (DC) offset from an angular velocity value from the gyro sensor;
calculate a first angle value by integrating the angular velocity value from which the DC offset is removed;
calculate a second angle value corresponding to the motion information of the pixel received from the processor;
calculate a measurement error of the gyro sensor by subtracting the second angle value from the first angle value;
remove the measurement error from the motion information of the electronic device; and
calculate the correction value based on the motion information of the electronic device from which the measurement error is removed.

2. The electronic device of claim 1, wherein the processor is further configured to:
calculate a movement vector of a pixel included in the image; and
send the motion vector to the optical image stabilization module.

3. The electronic device of claim 1, wherein the angular velocity value comprises angular velocities of each of a pitch axis and a yaw axis with respect to a direction that the second lens faces.

4. The electronic device of claim 1, wherein the optical image stabilization module removes the measurement error by subtracting the measurement error from the first angle value.

5. The electronic device of claim 1, wherein the optical image stabilization module comprises a low pass filter configured to filter the measurement error and removes the measurement error by subtracting the filtered measurement error from the first angle value.

6. The electronic device of claim 1, wherein the optical image stabilization module controls a lens driving module such that a position of the second lens is changed according to the correction value.

7. An image stabilization method of an electronic device, the method comprising:
detecting a motion of the electronic device using a gyro sensor by detecting an angular velocity value of each of a pitch axis and a yaw axis using the gyro sensor with reference to a direction that a lens of the electronic device faces;
photographing an image through the lens of the electronic device;
determining a motion of a pixel included in the image;
calculating a correction value using motion information of the electronic device and motion information of the pixel; and
performing image stabilization based on the correction value,
wherein calculating the correction value comprises:

calculating a measurement error of the gyro sensor based on the motion information of the electronic device and the motion information of the pixel;

removing the measurement error from the motion information of the electronic device; and calculating the correction value based on the motion information of the electronic device from which the measurement error is removed, and wherein calculating the measurement error comprises:

removing a direct current (DC) offset from the angular velocity value detected by the gyro sensor;

calculating a first angle value by integrating the angular velocity value from which the DC offset is removed;

calculating a second angle value corresponding to the motion information of the pixel; and subtracting the second angle value from the first angle value.

8. The method of claim 7, wherein determining the motion of the pixel included in the image comprises:

calculating a motion vector of the pixel included in the image.

9. The method of claim 7, wherein removing the measurement error comprises:

subtracting the measurement error from the first angle value.

10. The method of claim 7, wherein removing the measurement error comprises:

filtering the measurement error using a low pass filter; and subtracting the filtered measurement error from the first angle value.

11. The method of claim 7, wherein performing the image stabilization comprises:

changing a position of the lens based on the correction value.

12. A non-transitory computer-readable recording medium having recorded thereon a program for performing a method, the method comprising:

detecting a motion of the electronic device using a gyro sensor by detecting an angular velocity value of each of a pitch axis and a yaw axis using the gyro sensor with reference to a direction that a lens of the electronic device faces;

photographing an image through the lens of the electronic device;

determining a motion of a pixel included in the image;

calculating a correction value using motion information of the electronic device and motion information of the pixel; and performing image stabilization based on the correction value, wherein calculating the correction value comprises:

calculating a measurement error of the gyro sensor based on the motion information of the electronic device and the motion information of the pixel;

removing the measurement error from the motion information of the electronic device; and calculating the correction value based on the motion information of the electronic device from which the measurement error is removed, and wherein calculating the measurement error comprises:

removing a direct current (DC) offset from the angular velocity value detected by the gyro sensor;

calculating a first angle value by integrating the angular velocity value from which the DC offset is removed;

calculating a second angle value corresponding to the motion information of the pixel; and subtracting the second angle value from the first angle value.

* * * * *